United States Patent [19]
Lee et al.

[11] Patent Number: 5,914,762
[45] Date of Patent: *Jun. 22, 1999

[54] LIQUID CRYSTAL DISPLAY DEVICE WITH IMPROVED TRANSMITTANCE AND METHOD FOR MANUFACTURING SAME

[75] Inventors: Seung-Hee Lee, Ich'on; Seok-Lyul Lee, Anyang, both of Rep. of Korea

[73] Assignee: Hyundai Electronics Industries Co., Ltd., Kyoungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/972,995

[22] Filed: Nov. 19, 1997

[30] Foreign Application Priority Data

Nov. 29, 1996 [KR] Rep. of Korea ...................... 96-59509

[51] Int. Cl.$^6$ ........................... G02F 1/1343; G02F 1/133
[52] U.S. Cl. ............................. 349/141; 349/33; 349/38; 349/143; 349/139
[58] Field of Search ................................ 349/141, 143, 349/33, 139, 38

[56] References Cited

U.S. PATENT DOCUMENTS

| | | | |
|---|---|---|---|
| 4,952,031 | 8/1990 | Tsunoda et al. | 349/33 |
| 5,414,545 | 5/1995 | Lee | 359/53 |
| 5,426,313 | 6/1995 | Sukegawa et al. | 257/59 |
| 5,434,690 | 7/1995 | Hisatake et al. | 359/87 |
| 5,576,867 | 11/1996 | Baur et al. | 359/87 |
| 5,598,285 | 1/1997 | Kondo et al. | 349/141 |
| 5,600,464 | 2/1997 | Ohe et al. | 349/158 |
| 5,745,207 | 4/1998 | Asada et al. | 349/141 |

*Primary Examiner*—William L. Sikes
*Assistant Examiner*—Tarifur R. Chawdhury
*Attorney, Agent, or Firm*—Ware, Fressola, Van Der Sluys & Adolphson

[57] ABSTRACT

Disclosed is a liquid crystal display device improved transmittance and aperture ratio. The liquid crystal display device comprises a lower substrate, an upper substrate facing the lower substrate, and a liquid crystal interposed between the lower and upper substrate. A gate bus line and a data bus line is formed on the lower substrate in a matrix arrangement to define unit cell region. A thin film transistor is located near intersection of the gate bus line and the data bus line, for switching a signal inputted from the data bus line according to voltage applied to the gate bus line. A counter electrode is located inside unit cell region, for driving the liquid crystal, has a plurality of branches arranged parallel to each other and separated by a selected distance. A pixel electrode is connected to the thin film transistor to drive the liquid crystal together with the counter electrode and includes a plurality of slots for exposing the branches of the counter electrode. The counter electrode and the pixel electrode are formed out of a transparent conductive material. Also, the counter electrodes and the pixel electrodes are electrically insulated.

17 Claims, 4 Drawing Sheets

LIQUID CRYSTAL DISPLAY DEVICE WITH IMPROVED TRANSMITTANCE AND METHOD FOR MANUFACTURING SAME

BACKGROUND OF THE INVENTION

1. Field of the Invention

The present invention generally relates to a liquid crystal display device and a method for manufacturing the same, and more specifically to a liquid crystal display device comprising upper and lower substrates facing each other, liquid crystal interposed at a space between the upper and lower substrates, and counter electrode and pixel electrode formed on the lower substrate for driving the liquid crystal and a method for manufacturing the same.

2. Description of the Related Art

Recently, liquid crystal display devices(hereinafter abbreviated as LCDs) are widely utilized in word processors, personal computers, projection televisions and miniaturized televisions.

These LCDs are divided into various modes according to their liquid crystal molecule arrangements. The In-Plane Switching(IPS) mode which is applied to a super TFT-LCD and developed by Hitachi in 1995 was suggested to overcome the narrow viewing angle and the low contrast ratio of the twisted nematic(TN)-LCDs.

A description of IPS-LCDs is given below with reference to FIG. 1.

Figure 1:
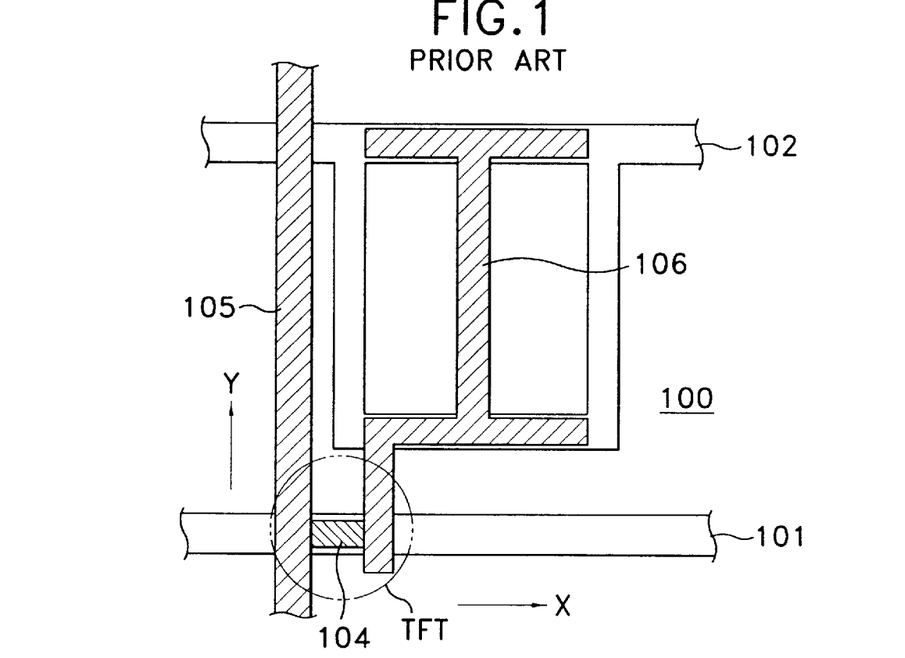
FIG. 1 is a plan view if a conventional IPS-LCD.

FIG. 1 shows a unit cell region of a LCD for convenience. First, a gate bus line 101 is arranged along a X-direction shown in FIG. 1. Next a data bus line 105 is arranged along a Y-direction to perpendicularly intersect with the gate bus line 101.

Near the intersection of the gate bus line 101 and the data bus line 105, a thin film transistor(hereinafter abbreviated as "TFT") including a channel layer 104 is provided. The channel layer 104 is formed on a selected portion of the gate bus line 101, and the data bus line 105 is overlapped with one end of the channel layer 104.

Inside the unit cell domain defined by the gate bus line 101 and the data bus line 105, a counter electrode 102 is formed in a rectangular frame shape. The counter electrode 102 is electrically connected to other counter electrodes which are adjacent to neighboring unit cell domains. A pixel electrode 106 comprises portions overlapped with the counter electrode 102 that are parallel to the gate bus line 101, and a portion parallel to the data bus line 105 which divides a space surrounded by counter electrodes 102. Also, the pixel electrode 106 is overlapped with the other end of the channel layer 104.

On an upper substrate(not shown) facing the lower substrate 100, color filters(not shown) and black matrix(not shown) dividing the color filters are formed. Next, a liquid crystal material is interposed between the lower substrate 100 and the upper substrate (not shown). The liquid crystal is driven by a field formed between the counter electrode 102 and the pixel electrode 106. The gate bus line 101, data bus line 105, counter electrode 102, and the pixel electrode 106 are all made from metal.

The IPS-LCDs having a structure as described above have counter electrodes 102 and pixel electrodes 106 driving the liquid crystal all formed in the lower substrate 100. Therefore, if a selected voltage is applied to the counter electrode 102 and the pixel electrode 106, a field horizontal to the lower substrate 100 is created. If the liquid crystal molecules are of positive dielectric anistropy ($\Delta\epsilon>0$), they also lie parallel to the field. Since the liquid crystal molecules seem to be lying in any direction, the viewing angle is enhanced.

However, the above described IPS-LCDs have inherent problems as below.

The counter electrode 102 and the pixel electrode 106 have a selected width, for example 5 to 10 $\mu$m. Although liquid crystal molecules located within 1 to 2 $\mu$m from the edges of the electrodes 102, 106 are affected by electric fields, liquid crystal molecules located at the upper center of the electrodes are not, due to an equipotential surface generated at the upper center portion of the electrodes 102, 106. Therefore, the liquid crystal molecules located around the upper center portion of the electrode 102, 106 cannot be driven.

In order to resolve the above problem, there is proposed a use of a structure to cover the pixel electrode 106 and the counter electrode 102 with an opaque metal film.

The proposed structure has, however, a shortcoming that the transmittance of the LCD is reduced since the opaque pixel electrode 106 and counter electrode 102 does not pass the light from the back light.

Moreover, the aperture ratio is low due to the opaque counter electrode 102 and pixel electrode 106. Therefore, to obtain adequate brightness, a back light with high brightness is necessary, which increases power consumption.

Meanwhile, the pixel electrode 106 divides the space surrounded by the counter electrode 102 into two parts. At this time, the pixel electrode 106 is separated in the Y-direction from the counter electrode 102 by 7 to 10 $\mu$m. Hence, the area where a field is created between the counter electrode 102 and the pixel electrode 106 is as large as the separated distance therebetween. However, response speed is reduced as the area of influence of field described above increases.

SUMMARY OF THE INVENTION

The object of the present invention is to solve the above problems and to provide LCDs with enhanced transmittance to light.

It is another object of the present invention to provide LCDs with enhanced aperture ratio.

It is still another object of the present invention is to provide LCDs with enhanced response speed.

It is further still another object of the present invention to provide a method for manufacturing such LCDs mentioned above.

To accomplish the objects of the present invention, a liquid crystal display device is provided having a lower substrate, an upper substrate facing the lower substrate, and a liquid crystal interposed between the lower and upper substrate. The liquid crystal display device comprises: a gate bus line and a data bus line formed on the lower substrate in a matrix arrangement to define unit cell region; a thin film transistor located near intersection of the gate bus line and the data bus line, for switching a signal inputted from the data bus line according to voltage applied to the gate bus line; a counter electrode located inside unit cell region, for driving the liquid crystal, wherein the counter electrode has a plurality of branches arranged parallel to each other and separated by a selected distance and is made of a transparent conducting material; a transparent insulating layer formed on the counter electrode; and a pixel electrode electrically connected to the thin film transistor, for driving the liquid crystal together with the counter electrode, the pixel electrode being made of transparent material, formed on the transparent insulating layer such that it overlaps with the counter electrode, and comprising a plurality of slots facing the underlying branches of the counter electrode with the intervening transparent insulating layer therebetween.

Also, the present invention provides a liquid crystal display device having a lower substrate, an upper substrate facing the lower substrate, and a liquid crystal interposed between the lower and the upper substrate. The liquid crystal display device comprises: a gate bus line and a data bus line formed on the lower substrate in a matrix arrangement to define unit cell; a thin film transistor located near intersection of the gate bus line and the data bus line, for switching a signal inputted from the data line according to voltage applied to the gate bus line; a counter electrode located inside the unit cell region, for driving the liquid crystal, wherein the counter electrode has a plurality of first slots formed parallel to each other and separated by a selected distance and is made of a transparent conducting material; a transparent insulating layer formed on the counter electrode; and a pixel electrode electrically connected to the thin film transistor, for driving the liquid crystal together with the counter electrode, the pixel electrode being made of transparent material, formed on the transparent insulating layer such that it overlaps with the counter electrode, and comprising a plurality of second slots facing portions in between the first slots with the intervening transparent insulating layer therebetween.

Also, to accomplish the above objects, the present invention provides a method for manufacturing a liquid crystal display device comprising the steps of: forming a counter electrode on a lower insulation substrate made of a transparent conducting material; depositing a metal film over the lower insulation substrate and patterning a selected portion of the metal film to form a common electrode line contacting with the counter electrode and a gate bus line simultaneously; forming a gate insulating film over the lower substrate; forming a channel layer over the gate insulating film such that the channel layer is overlapped with the gate bus line by a first selected portion; simultaneously forming a data bus line and a drain such that second selective portions of the data bus line and the drain are overlapped with the channel layer; and forming a pixel electrode contacting with the drain and overlapped with the counter electrodes made of a transparent material.

BRIEF DESCRIPTION OF THE DRAWINGS

These and other features, aspects, and advantages of the present invention will become better understood with reference to the following description, appended claims, and accompanying drawings, wherein

DETAILED DESCRIPTION OF THE INVENTION

Embodiment 1

Figure 2:
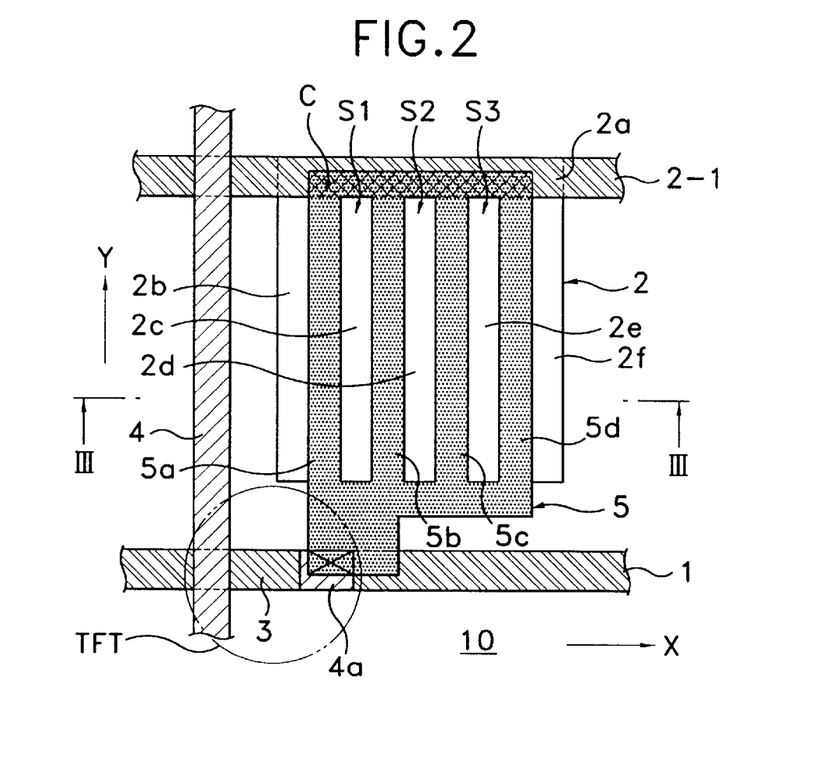
FIG. 2 is a plan view of a LCD according to the first embodiment of the present invention.
Figure 3:
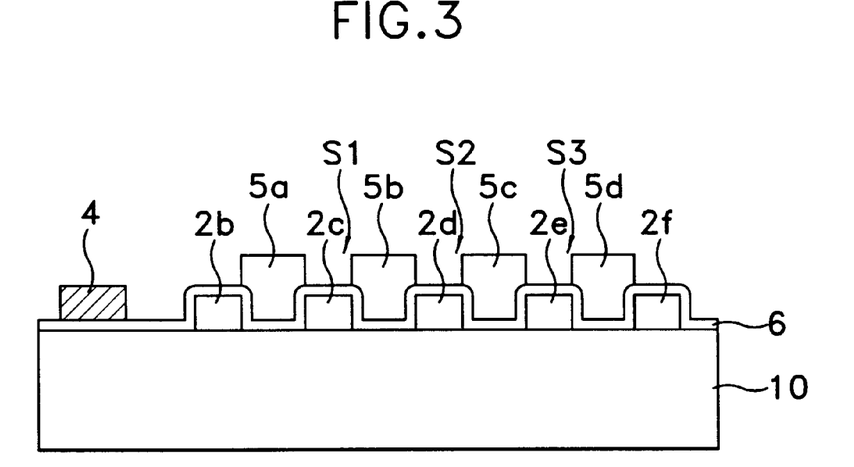
FIG. 3 is a sectional view of the lower substrate taken along the III—III' line shown in FIG. 2.

FIG. 2 is a plan view of a LCD according to the first embodiment of the present invention, and FIG. 3 is a sectional view of the lower substrate taken along the III—III' line shown in FIG. 2. In FIG. 2, a unit cell region including a single gate bus line 1 and data bus line 4 is shown for the convenience of description.

Referring to FIG. 2, a gate bus line 1 is arranged on a lower substrate 10 along the X-direction shown in FIG. 2. Also, a data bus line 4 is arranged along the Y-direction which perpendicularly intersect with the gate bus lines 1. The gate bus lines 1 and the data bus lines 4 are made of an opaque material, for example, Al, Ta, Ti. Also, an insulating film is interposed between the gate bus line 1 and the data bus line 4 to provide electrical insulation between them. Here, the gate bus lines 1 and the data bus lines 4 are arranged in a matrix to define a unit cell region.

Thin film transistor TFT including a channel layer 3 are provided near the intersection of the gate bus line 1 and the data bus line 4. The TFT is to switch a signal inputted from the data bus line 4 according to a drive voltage applied to the gate bus line 1. The channel layer 3 is formed on a selected portion of the gate bus line 1. At this time, one end of the channel layer 3 overlaps with the data bus line 4, and the other end of the channel layer 3 overlaps with the source 4a of the thin film transistor TFT.

A counter electrode 2 is arranged within the unit cell surrounded by the gate bus line 1 and the data bus line 4. The counter electrode 2 includes a main line 2a which is parallel to the gate bus line 1 and is in contact with a common counter electrode 2-1 by a selected portion, and a plurality of branches 2b, 2c, 2d, 2e, 2f . . . Here, each branch is branched from the main line 2a, for example, to five branches, and each branch is separated by an equal distance and arranged parallel to the data bus line 4. Also, the counter electrode 2 is made of a transparent material, for example, indium tin oxide(ITO). Since the branches 2b–2f are all located in a limited space, the width of the branches may be smaller than that of conventional LCDs, preferably in a range of about 2 to 5 $\mu$m. The branches 2b–2f are extended towards the gate bus line 1. The common electrode line 2-1 which is parallel to the gate bus line 1 and is separate therefrom, is electrically connected to a common electrode terminal(not shown). The common electrode line 21 is made of opaque metallic material, for example, Al, Ta, Ti.

Over the counter electrode 2, there is provided a pixel electrode 5 having a plurality of slots S1, S2, S3 . . . The pixel electrode 5 is electrically connected to the source 4a of the TFT, and overlaps with the counter electrode 2. In order to insulate the pixel electrode 5 from the underlying counter electrode 2, there is provided an insulating layer 6 (see FIG. 3) of a transparent material between them. The transparent insulation film is of at least one material selected from a group consisting of $SiO_2$ and $Si_xN_y$, wherein x and y are integer. The slots S1, S2, S3 . . . , for example three slots of the pixel electrode 5 are formed such that each corresponds to the underlying branches 2b–2f of the counter electrode 2. Hereinbelow, a portion between two adjacent slots is referred to as a "bar". In this embodiment, there are provided four bars 5a–5d for the pixel electrode 5. The width of the slots S1, S2, S3 is identical to that of the branches 2b, 2c, 2d, 2e, 2f. It is preferable that the width of bars between the slots S1 and S2, S2 and S3 is identical to that of the branches 2b–2f of the counter electrode 2. Also, the pixel electrode 5 is made of the transparent material, such as, indium tin oxide(ITO).

As shown in FIG. 2, the counter electrode 2 has five branches 2b–2f, and the pixel electrode 5 has three slots S1–S3, so that the outermost branches 2b, 2f at both sides of the counter electrode 2 in X-direction are outwardly positioned compared with the outermost bars 5a, 5d at both sides of the pixel electrode 5 in X-direction. Meanwhile, the pixel electrode 5 may be formed such that it has a larger area than the counter electrode 2. In other words, the counter electrode 2 and the pixel electrode 5 can be formed such that the number of the branches of the counter electrode 2 is identical to that of the bars of the pixel electrode 5.

A storage capacitor C is formed at an overlapping portion of the main line 2a of the counter electrode 2 and the pixel electrode 5.

Referring to FIG. 3, each branch of the counter electrode 2 and each bar 5a–5d of the pixel electrodes 5 adjacent thereto are arranged side by side without any gaps between selected branches and bars adjacent to the selected branches. Accordingly, as the space affected by a field is reduced, the response speed of the LCD is enhanced. Also, as the counter electrode 2 and the pixel electrode 5 are of transparent material, transmittance and aperture ratio are enhanced.

As mentioned above, since the counter electrode 2 and the pixel electrode 5 are of transparent material, it is preferable to make the width of branches of the counter electrode 2 and the width of bars of the pixel electrode 5 as narrow as possible, so as to effectively drive the liquid crystal molecules arranged at the upper portion of the electrodes 2 and 5. Reducing the width is to suppress the occurrence of equipotential regions in branches of the counter elelctrode 2 and bars of the pixel electrode 5.

As shown in FIG. 3, the branches 2b–2f of the counter electrode 2 and the bars 5a–5d of the pixel electrodes 5 are arranged in turn side by side in a limited space, with their width reduced(2 to 5 µm) than that of the conventional art. Accordingly, with only the field affecting the edges of both of the branches 2b–2f of the counter electrodes 2 and the bars 5a–5d of the pixel electrode 5, all of the liquid crystal molecules located at the upper portion of both of the branches 2b–2f of the counter electrode 2 and the bars 5a–5d of the pixel electrode 4 can be driven. Hence transmittance and aperture ratio of LCDs can be enhanced.

Embodiment 2

Figure 4:
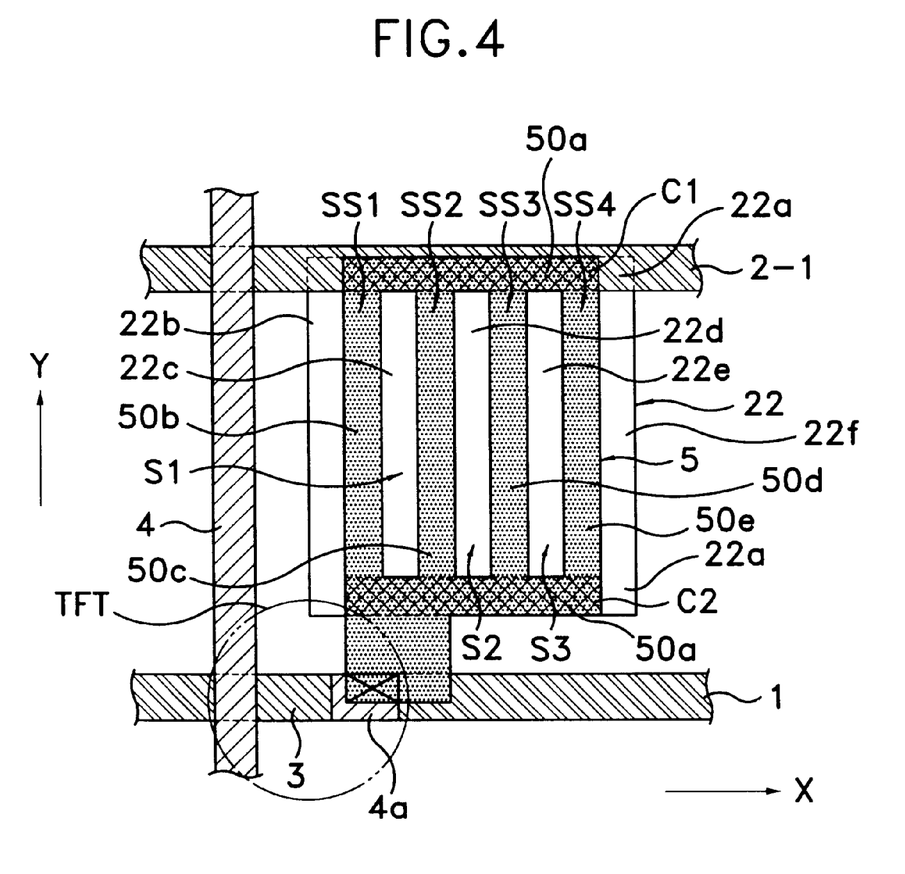
FIG. 4 is a plan view of a LCD according to the second embodiment of the present invention.

FIG. 4 is a plan view of a LCD according to the second embodiment.

As shown in FIG. 4, similarly to the first embodiment, a gate bus line 1 and a data bus line 4 are arranged on a lower substrate 10. Here, the gate bus line 1 and the data bus line 4 are arranged in a matrix to define a unit cell region. A thin film transistor TFT comprising a channel layer 3 is arranged near the intersection of the gate bus line 1 and the data bus line 4.

A counter electrode 22 is arranged inside the unit cell region surrounded by gate bus line 1 and data bus line 5. The counter electrode 22 comprises first two main lines 22a parallel to the gate bus line 1 and a plurality of first bars, for example five bars 22b–22f, coupled between the first two main lines 22a. In between the first bars 22b–22f, there are a plurality of first slots SS1, SS2, SS3, SS4 . . . , for example four slot, each being 2 to 5 µm wide, separated by an equal distance from each other. The width of the first slots SS1, SS2, SS3, SS4 . . . is identical to that of the first bars of the counter electrode 22.

A common electrode line 2-1 is parallel to the gate bus line 1 and is electrically connected to common electrode terminal(not shown) so as to drive selected counter electrode 22. The common electrode lines 2-1 are made of an opaque metal, for example, Al, Ta, Ti.

A pixel electrode 50 includes second two main lines 50a parallel to the gate line 1 and a plurality of second bars 50b–50e coupled between the second two main lines 50a. The second two main lines 50a of the pixel electrode 50 overlaps with the first two main lines 22a of the counter electrode 22. The pixel electrode 50 is electrically connected to TFTs. A transparent insulation film(not shown) is interposed between the counter electrode 22 and pixel electrode 50 so as to provide electrical insulation between them. The transparent insulation film is of at least one material selected from a group consisting of $SiO_2$ and $Si_xN_y$, wherein x and y are integer. The pixel electrode 50 includes a plurality of second slots S1, S2, S3 . . . , for example three slots so that the first bars 22b–22f of the counter electrode 22 can be exposed. Here, the second slots S1–S3 are between the second bars 50b–50e.

The width of the second slots S1, S2, S3 is identical to that of the first bars 22b–22f of the counter electrode 22, and is also identical to that of the bars 50b–50e of the pixel electrode 50.

The outermost first bars 22b, 22f at both sides of the counter electrode 22 in X-direction are not exposed through the second slots S1, S2, S3 but are exposed directly. In further detail, the counter electrode 22 has five bars, and the pixel electrode 50 has three slots S1–S3, so that the outermost first bars 22b, 22f at both sides of the counter electrode 22 in X-direction are outwardly positioned compared with the outermost second bars 50b, 50e at both sides of the pixel electrode 50 in X-direction. Meanwhile, the pixel electrode 50 may be formed so as to have a larger area than the counter electrode 22. In other words, the counter electrode 22 and the pixel electrode 50 can be formed such that the number of the first bars of the counter electrode 22 is identical to that of the second slots of the pixel electrode 50. Here, two storage capacitors C1 and C2 are independently formed at portions where the second two main lines 50a of the pixel electrode 50 overlap with the first two main lines 22a of the counter electrode 22.

As described above, since the overlapping portions of the counter electrode 22 and the pixel electrode 50 are considerably increased, storage capacitance is also increased.

Embodiment 3

Figure 5A:
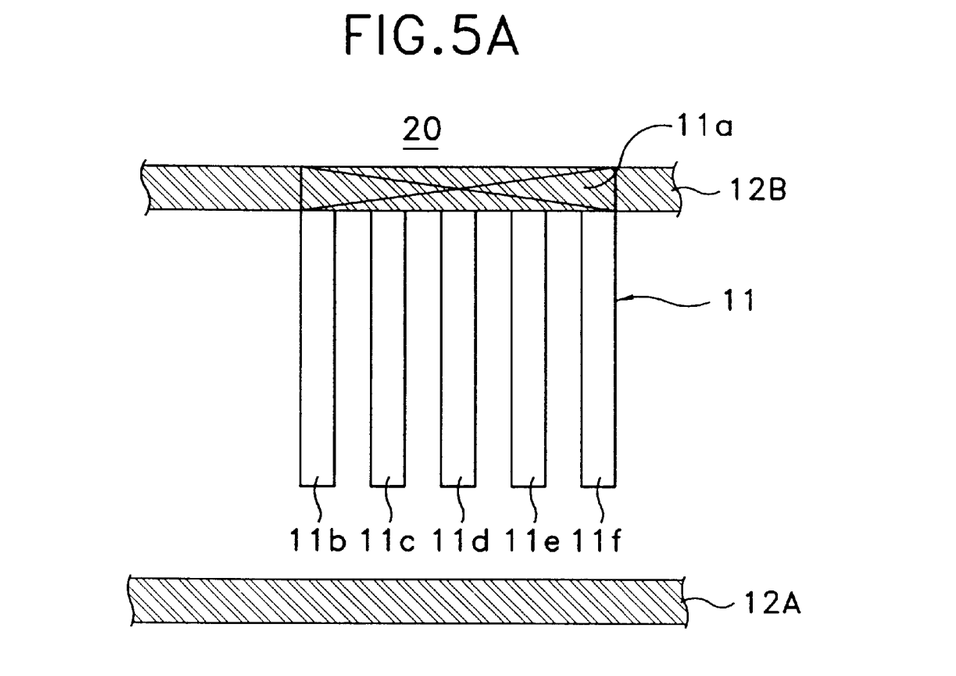
FIG. 5A through FIG. 5C are plan views of a LCD panel illustrating a manufacturing method for LCDs according to the third embodiment of the present invention.
Figure 5B:
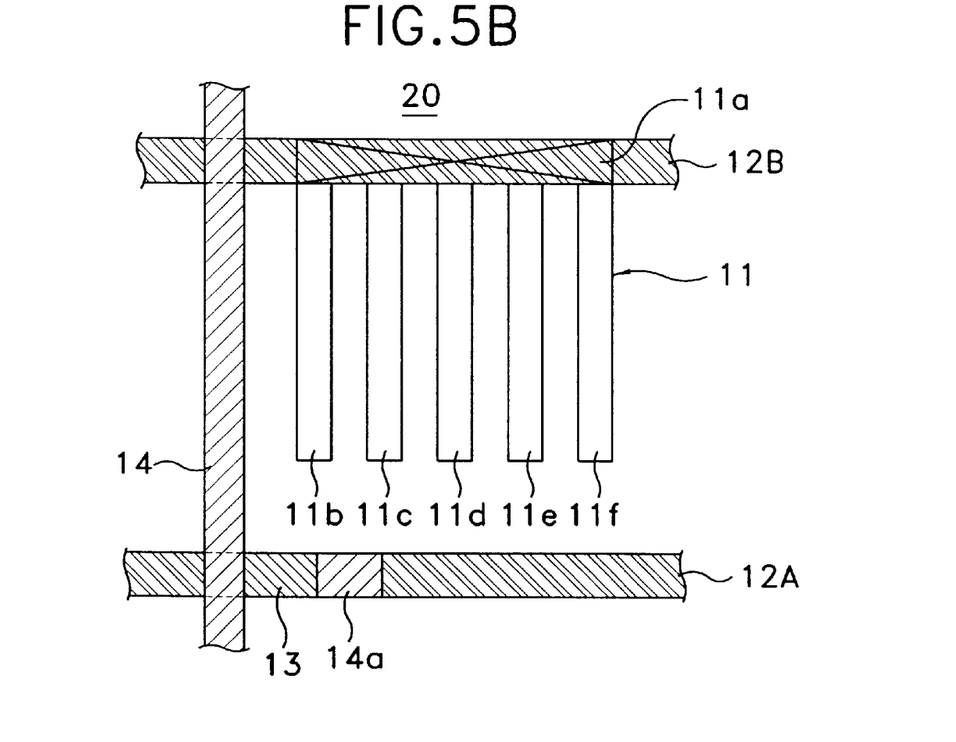
Figure 5C:
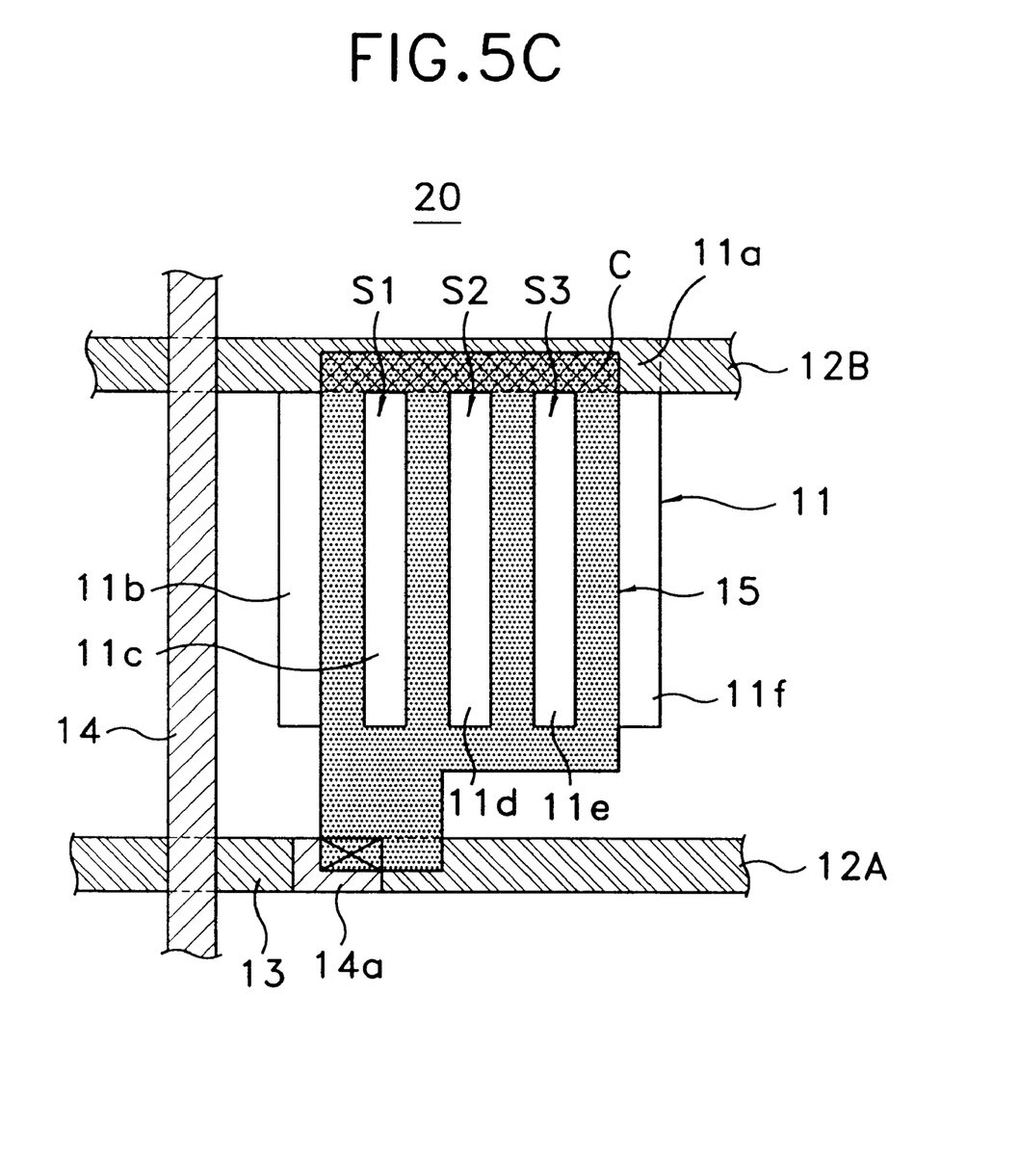

FIG. 5A through FIG. 5C are plan views of a LCD panel illustrating a method for manufacturing a LCDs according to a third embodiment of the present invention.

First, referring to FIG. 5A, a transparent conducting layer is deposited to a selected thickness over a lower substrate 20. Afterwards, The transparent conductive layer is patterned to form a counter electrode 11 within unit cell. In this process, the counter electrode 11 can be patterned to have a main line 11a and a plurality of branches 11b–11f branched from the main line 11a as in the first embodiment or to have two main lines and a plurality of slots as in the second embodiment. According to another embodiment, it is possible to form first the gate bus line 12A and the common electrode line 12B and afterwards the counter electrode 11

Next, an opaque metal film, for example, Al, Ta, Ti is deposited over the lower substrate 20 including the counter electrode 11. This opaque metal film is patterned to form a gate bus line 12A which is separated from the counter electrode 11 by a selected distance, and a common electrode line 12B which is in contact with the main line 11f of the counter electrode 11.

Referring to FIG. 5B, a transparent insulating film(not shown) is deposited over the lower substrate 20. The transparent insulating film is of at least one material selected from a group consisting of $SiO_2$ and $Si_xN_y$, wherein x and y are integer. A channel layer 13 is then formed on a selected portion of the gate bus line 12A of amorphous silicon utilizing a conventional method. A data bus line 14 is formed by depositing an opaque metal over the gate insulating film(not shown) and patterning the opaque metal so as to be perpendicular to the gate bus line 12A. The data bus line 14 is formed to overlap with one end of the channel layer 13. Simultaneously with forming the data bus line 14, a drain 14a is formed to overlap with the other end of the channel layer 13.

Afterwards, referring to FIG. 5C, a transparent conductive layer for forming pixel electrodes is deposited over the lower substrate 20. Next, a pixel electrode 15 is formed by patterning the transparent conductive layer so that it is in contact with the source 14a.

The present invention is not limited to the above third embodiment.

In the third embodiment, the pixel electrode was formed after the data bus line was formed, but in another embodiment, it could be reversed.

As described previously, branches or bars of the counter electrode and bars of the pixel electrode adjacent thereto are arranged side by side without any gaps between the branches (or bars) of the counter electrode and the bars of the pixel electrode. Hence, as the space effected by a field is reduced, the response speed of the LCD is enhanced.

Also, since the counter electrode and the pixel electrode are made of a transparent material, transmittance and aperture ratio are considerably increased.

Moreover, the counter electrode and the pixel electrode are arranged in turns side by side in a limited space, with their width reduced(2 to 5 μm) than that of a conventional art. Accordingly, with only the field affecting the edges of the electrodes, all of the liquid crystal molecules located at the upper portion of the counter electrode and the pixel electrode can be driven. Hence aperture ratio of LCDs can be enhanced.

Various modifications not departing from the technical principles and spirit of the present invention could be apparent to those skilled in the art. Hence the attached claims are not limited to the descriptions given above. The claims include all the inventive and novel elements inherent in the present invention, and all the possible variations those skilled in the art may realize.

What is claimed is:

1. A liquid crystal display device having a lower substrate, an upper substrate facing the lower substrate, and a liquid crystal interposed between the lower and upper substrates, the liquid crystal display device including a plurality of unit cell regions formed on said lower substrate, each unit cell region comprising:

a gate bus line and a data bus line formed on the lower substrate in a matrix arrangement to define said unit cell region;

a thin film transistor located near intersection of the gate bus line and the data bus line formed on said lower substrate, for switching a signal inputted from the data bus line according to voltage applied to the gate bus line;

a counter electrode located inside the unit cell region formed on said lower substrate, for driving the liquid crystal, wherein the counter electrode comprises a main line parallel to the gate line and a plurality of branches branched from the main line, arranged parallel to each other and separated by a selected distance, and is made of a transparent conductive material;

a transparent insulating layer formed on the counter electrode that is located inside the unit cell region formed on said lower substrate; and a pixel electrode electrically connected to the thin film transistor, for driving the liquid crystal together with the counter electrode, the pixel electrode being made of transparent material, formed on the transparent insulating layer such that it overlaps with the counter electrode, said insulating layer for insulating said counter electrode from said pixel electrode, said pixel electrode comprising a plurality of slots facing the underlying branches of the counter electrode.

2. The liquid crystal display device as claimed in claim 1, wherein the counter electrode and the pixel electrode are made of indium tin oxide.

3. The liquid crystal display device as claimed in claim 1, wherein the width of the branches of the counter electrode is in the range of 2 to 5 μm.

4. The liquid crystal display device as claimed in claim 3, wherein the width of the slots of the pixel electrode is identical to that of the branches of the counter electrode.

5. The liquid crystal display device as claimed in claim 4, wherein the width of the slots of the pixel electrode is identical to that between two adjacent slots of the pixel electrode.

6. The liquid crystal display device as claimed in claim 1, wherein the outermost branches of the counter electrode are not exposed through the slots of the pixel electrode but are exposed directly.

7. The liquid crystal display device as claimed in claim 1, wherein the transparent insulation film is of at least one material selected from a group consisting of $SiO_2$ and $Si_xN_y$, wherein x and y are integer.

8. The liquid crystal display device as claimed in claim 1, wherein a storage capacitor is formed at the overlapping portions of the counter electrode and the pixel electrode.

9. A liquid crystal display device having a lower substrate, an upper substrate facing the lower substrate, and a liquid crystal interposed between the lower and upper substrates, the liquid crystal display device comprising:

a gate bus line and a data bus line formed on the lower substrate in a matrix arrangement to define unit cell region;

a thin film transistor located near intersection of the gate bus line and the data bus line, for switching a signal inputted from the data bus line according to voltage applied to the gate bus line;

a counter electrode located inside the unit cell region, for driving the liquid crystal, wherein the counter electrode has a plurality of first slots formed parallel to each other and separated by a selected distance, and is made of a transparent conductive material;

a transparent insulating layer formed on the counter electrode; and a pixel electrode electrically connected to the thin film transistor, for driving the liquid crystal together with the counter electrode, the pixel electrode being made of transparent material, formed on the transparent insulating layer such that it overlaps with the counter electrode, said insulating layer for insulating said counter electrode from said pixel electrode, said pixel electrode comprising a plurality of second slots facing portions of the counter electrode between the first slots.

10. The liquid crystal display device as claimed in claim 9, wherein the counter electrodes and the pixel electrodes are made of indium tin oxide.

11. The liquid crystal display device as claimed in claim 9, wherein the width of the first slots and the counter electrodes exposed between the first slots are respectively in a range of 2 to 5 µm.

12. The liquid crystal display device as claimed in claim 11, wherein the width of the second slots are identical to that of the first slots and also identical to that of the pixel electrode between the second slots.

13. The liquid crystal display devices as claimed in claim 9, wherein the transparent insulation film is of at least one material selected from a group consisting of $SiO_2$ and $Si_xN_y$, wherein x and y are integer.

14. The liquid crystal display device as claimed in claim 9, wherein a storage capacitor is formed at the overlapping portion of the counter electrode and the pixel electrode.

15. A method for manufacturing a liquid crystal display device, the method comprising the steps of:

forming a counter electrode on a lower insulation substrate, said counter electrode made of a transparent conductive material;

depositing a metal film on the lower insulation substrate and patterning a selected portion of the metal film to form a common electrode line contacting with the counter electrode and a gate bus line simultaneously;

forming a transparent insulating film on the lower substrate;

forming a channel layer on the transparent insulating film such that the channel layer is overlapped with the gate bus line by a first selected portion;

simultaneously forming a data bus line and a drain on the transparent insulating film such that selective portions of the data bus line and the drain are overlapped with the channel layer;

forming a pixel electrode such that the pixel electrode contacts with the drain and is overlapped with the counter electrodes, wherein the pixel electrode is made of a transparent material.

16. The method of claim 15, wherein said counter electrode and said pixel electrode overlap so that plural branches or bars of said counter electrode are in between plural pixel electrode bars and are facing plural pixel electrode slots, and wherein at least several of said counter electrode branches or bars, said counter electrode slots, said pixel electrode bars, and said pixel electrode slots have a substantially identical width.

17. Liquid crystal display device having a liquid crystal between two substrates and having a plurality of unit cells formed on one of said substrates, each unit cell including a counter electrode and a pixel electrode that overlap each other on said one substrate and that are separated by an insulating material, characterized in that said insulating material, said counter electrode and said pixel electrode are transparent, that said counter electrode includes plural branches or bars with slots in between, that said pixel electrode includes plural bars with slots in between, that said counter electrode and said pixel electrode overlap so that said counter electrode branches or bars are in between said pixel electrode bars and facing said pixel electrode slots, and that at least several of said counter electrode branches or bars, said counter electrode slots, said pixel electrode bars and said pixel electrode slots have a substantially identical width.

* * * * *

UNITED STATES PATENT AND TRADEMARK OFFICE
CERTIFICATE OF CORRECTION

PATENT NO : 5,914,762
DATED : June 22, 1999
INVENTOR(S): Lee et al

It is certified that error appears in the above-identified patent and that said Letters Patent is hereby corrected as shown below:

At col. 4, line 41, please cancel "21" and substitute therefor --2-1--.

Signed and Sealed this

Eleventh Day of April, 2000

Attest:

Attesting Officer

Q. TODD DICKINSON

Director of Patents and Trademarks